3,709,784
HYDROCARBON FERMENTATION
Andre Deschamps, Chatou, Sigismond Franckowiak, Montesson, Claude Gatellier, Boulogne, Seine, Georges Glikmans, Meudon la Foret, and Philippe Renault, Noisy le Roi, France, assignors to Institut Francais du Petrole, Des Carburants et Lubrifiants, Rueil Malmaison, France
Filed June 26, 1970, Ser. No. 50,184
Claims priority, application France, June 7, 1969, 6923037
Int. Cl. C12b 1/00
U.S. Cl. 195—28 R                              13 Claims

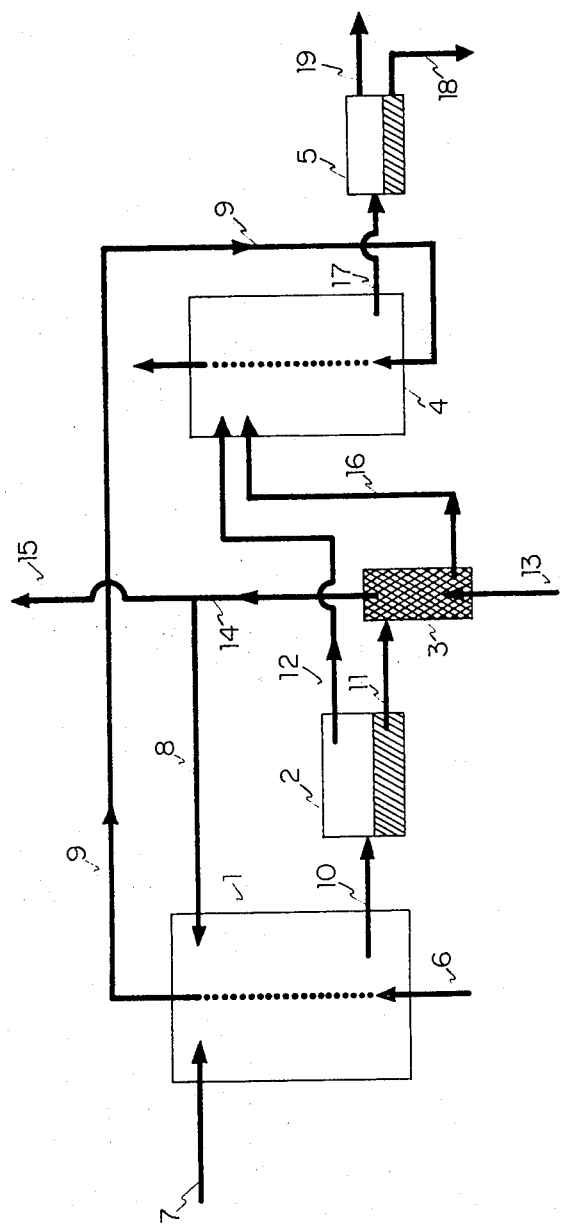

ABSTRACT OF THE DISCLOSURE

This invention relates to a five-steps process for growing microorganisms such as yeasts, said process comprising (a) growing a microorganism on a n-paraffins substrate, (b) separating a microorganism phase, (c) contacting the microorganism phase with a n-paraffinic stock which is used thereafter as substrate for the first step, (d) subjecting the resulting microorganism to the cultivation conditions of step one, without added hydrocarbon, and (e) separating the resulting microorganisms.

---

This invention relates to an improved process for growing any monocellular microorganism whose protoplasm is useful either as food or as base for chemicals, in an aqueous nutritive medium containing a hydrocarbon and an oxygen-containing gas.

Microorganisms have been cultivated up to now on such carbohydrates substrates as molasses, wood hydrolysates and cheese lactoserum; they have been cultivated also on chemically reduced substrates such as hydrocarbons; however in the latter case the oxygen requirements are far higher than in the other types of culture.

Cultivating microorganisms in the presence of petroleum hydrocarbons is an old process. For example, Just, Schnabel and Ullmann have described such a process in "Die Brauerei-Wissenschaftliche Beilage," No. 8, August 1951. These workers have successfully grown yeasts and bacteria on various hydrocarbons with added oxygen and aqueous nutritive media.

An improved process for growing microorganisms has been described by assignors in French patent application No. 151,959 filed May 15, 1968, corresponding to the Belgian Pat. No. 732,065 and U.S. patent application No. 824,256 now allowed. Such a process consists of cultivating microorganisms in the presence of oxygen, an aqueous nutritive medium and a hydrocarbon substrate containing at least 70% by weight of straight-chain paraffins (normal paraffins); in a first step, then separating the thus cultivated microorganisms from the aqueous nutritive medium and from the unconverted hydrocarbon substrate, in a second step; and finally, in a maturation third step, contacting the thus separated microorganisms with a non-nutritive aqueous medium, in the presence of added oxygen.

The non-nutritive aqueous medium was defined as a medium free of at least one element which is essential for growing microorganisms, for example ions the nature of which depends of the type of cultivated microorganism.

This prior process, as defined in the above-mentioned patent application, has many advantages with respect to the other known processes, particularly with respect to a known process wherein the microorganisms which have been separated from the fermentation vessel are subjected to a treatment with oxygen in the presence of a complete inorganic aqueous medium.

The process which is an object of this invention is a new and modified process which has additional advantages, for example:

Very pure proteins may be obtained, i.e., cells having a lower content of lipides and ribonucleic acids as compared with known processes, The consumption of nutritive inorganic salts is quite reduced, In a particular embodiment of the process, the compression costs for the oxygen-containing gas to be used for growing microorganisms are also reduced.

These results are obtained according to the following five steps process:

(1) A microorganism and an oxygen-containing gas are contacted with a hydrocarbon stock containing at least 70% and preferably at least 85%, by weight of straight-chain paraffins, and with a nutritive aqueous medium, the hydrocarbon stock being derived at least in part (at least 10% by weight) from the third step hereinafter defined, the contact time corresponding to a decrease of the total content of n-paraffins (either free or adsorbed) down to 0.2–5% and preferably 0.5–2% by weight with respect to the hydrocarbon stock.

The aqueous medium may contain:

(a) sources of assimilable nitrogen and phosphorus,
(b) oligoelements
(c) growth factors
(d) additional essential inorganic elements.

The amount of straight-chain paraffinic hydrocarbons is thus lower than the amount required for an optimal growth of the microorganisms.

According to a preferred embodiment, the oxygen-containing gas is used under an absolute pressure of 1.2 to 20 atmospheres, and preferably 1.5 to 4 atmospheres.

(2) A microorganism-rich phase containing adsorbed hydrocarbons is separated from at least the major part of the nutritive aqueous medium and from the unconverted hydrocarbons, when the latter are present in the form of a separate phase; this separation may be carried out according to any known process, for example by settling, filtration and/or centrifugation.

(3) The microorganisms recovered from the second step are contacted (washed) with a hydrocarbon stock containing at least 70% and preferably at least 85% by weight of straight-chain paraffinic hydrocarbons. The concentrated microorganisms phase is separated from the hydrocarbon stock, and the latter is passed to the first stage vessel to be used as feedstock therein. This separation is carried out by any known process, for example one disclosed in paragraph No. 2 above.

(4) The microorganisms from the latter step are contacted with an aqueous nutritive medium, for example such as defined in paragraph No. 1, and with a molecular oxygen containing gas.

However the greatest advantages of this 4th step are obtained:

When there is used at least one part of the aqueous nutritive medium from the second step separation, When there is used at least one part of the molecular oxygen containing gas which has remained unconverted in step No. 1.

(5) The thus obtained microorganisms are separated, for example by using one of the known processes described in the above paragraph 2.

These 5 steps will now be described in greater detail:

(a) In the first step, the temperature is preferably maintained between 20 and 40° C., particularly between 27 and 33° C.; the pH is lower than 7 and preferably maintained between 3 and 5. This result may be obtained, for example, by continuous or stepwise injections of basic solutions, for example ammonia, when the medium tends to be acidified by the metabolism.

The hydrocarbon cut which is used as feedstock may be obtained by removing n-paraffins from such hydrocarbon stocks as a gas oil, a fuel oil or a lubricating oil, i.e. hydrocarbons containing at least 9 carbon atoms per molecule.

The nitrogen source may be ammonium ions, nitrate ions or urea; phosphorus may be used as phosphate ions; the oligoelements, i.e. the ions of metals and metalloids which are required in quite low amounts, for example iron and copper, are used in trace amounts; the growth factors are compounds of the vitamin B type which may be used in the form of yeast extracts; the other essential inorganic elements may be used in the form of ions and their nature depends on the type of cultivated microorganism.

This invention is not limited to particular elements (a), (b), (c) and (d) (paragraph No. 1 supra). These elements are well-known from those skilled in the art and many examples of nutritive aqueous media may be found in the prior literature and patents. In any case, it is easy to check by means of a previous simple cultivation experiment if these media are convenient for growing a given microorganism.

For example, the nutritive aqueous medium may contain such other essential inorganic elements as potassium, sulfur, for example in the form of sulfates, and magnesium, as well as sodium calcium and chloride ions.

During this step, the microorganisms grow and multiply themselves at a rate which may be easily controlled by the amount of paraffinic hydrocarbons contained in the feed.

As a rule, the content of nitrogen compound, for example ammonium sulfate, of the aqueous medium is usually between 0.1 and 60 grams per liter, preferably 1–20 grams per liter, although one may operate outside these ranges.

The content of phosphorus compounds, expressed as $P_2O_5$, is usually 0.1 to 10 grams per liter. Phosphorus and nitrogen are preferably introduced into the aqueous nutrition medium in the form of ammonium phosphate.

While, in the prior processes, this first step was carried out under atmospheric pressure, the superatmospheric pressure oxygen used in a preferred embodiment of this process makes the growth of the microorganisms easier; it also provides for the direct re-use, during the fourth step, of the gas from this first step.

This first step may be carried out with any apparatus adapted for contacting said phases, for example such an apparatus as described in the French Pat. 1,529,536 or, better, in the French patent application 177,774 filed by the assignors of the present invention on the 11th of December 1968 (corresponding to the published Dutch patent application No. 6918576). This application describes industrial equipment for intimately contacting several immiscible liquid phases, a gas phase and a solid phase (for example yeast); the oil cut is continuously introduced as well as a nutritive medium containing an excess of all elements other than carbon compounds, the latter being in less amounts to provide for a proliferation and a growth rate corresponding to the continuous withdrawal of the microorganisms.

As indicated above, the superatmospheric pressure of the oxygen containing gas results in an increase of the velocity at which oxygen is transferred through the cultivation medium to the proliferating cells of the microorganism; the gas which is separated from the reactor may be used under pressure in the following operations as shown hereinafter, according to a preferred embodiment of this invention.

(b) The second step may be carried out by mere decantation; the latter is only possible when the first step has been carried out under the above conditions, particularly when the hydrocarbon feedstock contains at least 70% by weight of linear paraffins.

At the end of this second step, the microorganisms may be recovered as a paste or cream usually containing 5–30% by weight of microorganisms (dry weight). They are contaminated by the aqueous medium and the hydrocarbons adsorbed on the cell walls. These hydrocarbons are mainly branched hydrocarbons since the straight-chain hydrocarbons have been preferentially consumed. Furthermore, the microorganisms contain oxidation by-products such as fatty acids which can be removed in the further steps of the process, together with the adsorbed hydrocarbons.

(c) The third step of the process comprises a washing (contacting) by means of a hydrocarbon stock which has a high content of n-paraffins. This washing step is preferably carried out in the presence of oxygen. The object of the step is to substitute the hydrocarbons which contaminate the external surface of the microorganism cells (essentially branched hydrocarbons which are not consumed easily) with hydrocarbons having a higher content of n-paraffins. The latter constitute the carbon substrate for the following operation, also called secondary fermentation.

The ratio by weight of the hydrocarbon feedstock to the cells (dry weight) is usually in the range of 0.5 to 5. Below 0.5, the adsorbed hydrocarbons are not exchanged so completely, while beyond 5, the volumes to be handled tend to be higher without a corresponding increase of the degree of purification.

This washing step is preferably carried out in a column of the type conventionally used for liquid-liquid extractions: the microorganisms are injected at the higher part of the column, which column is fed at its bottom with a washing liquid as hereinbefore defined; the microorganisms flow downstream towards the bottom of the column from which they are withdrawn, while the washing liquid flows upstream in counter-current contact.

The washing liquid, which consists of hydrocarbons with a high content of n-paraffins, is quite different from the washing liquids used in the known processes, which liquids consist of water, surface active agents or volatile organic solvents.

(d) The fourth step of the process consists of a second fermentation step; it may be carried out in an apparatus of the same type as that used in the first step, or in an apparatus of a different type, the object being to contact the microorganisms from step (c) with a gas containing molecular oxygen and with a nutrition aqueous medium.

According to a preferred embodiment, at least one part of the oxygen containing gas consists of the gas removed from the first step, and at least one part of the nutritive aqueous medium consists of the aqueous medium withdrawn from the first step reactor after the second step separation. Preferably these two streams in their entirety are passed to the secondary fermentation vessel in which the cells multiply again by budding and division.

One main advantage of this technique results from the fact that the gas, usually air, which has been used for growing microorganisms in the first fermentation stage (first step) is directly passed to the second fermentation stage (fourth step of the process) without intermediate compression, which results in a substantial saving of a compression device.

It will be appreciated that, in that case, the same aqueous medium, or, at the least, one part thereof is successively used in the two fermentation stages.

Further, in this second fermentation stage, the microorganisms are only fed with adsorbed hydrocarbons, since there remains no free hydrocarbon phase, and it has been shown that these adsorbed hydrocarbons, following the washing step (c), have a high content of straight-chain paraffins. This consumption is quicker and more complete than with branched hydrocarbons; the formation of by-products is greatly reduced if not completely suppressed.

The residence time, for each of the fermentation steps, is selected at will and is usually 1 to 10 hours.

By microorganisms there is meant in this invention, hydrocarbon-consuming yeasts, bacteria, moulds and their mixtures. by way of non-limitative examples, there will be mentioned:

(a) among yeasts:

The Endomycetaceae family, particularly the Saccharomycetoideae sub-family, to which belong the Pichia, Hansenula and Debaryomyces generi, the Lipomycetoideae sub-family and particularly the Lipomyces genus, The Cryptococcaceae family, particularly the Cryptococcoideae sub-family to which belong the Torulopsis and candida generi, the Rhodotoruloideae sub-family, for example the Rhodotorula genus.

(b) among bacteria:

The Pseudomonadales order, for example the Pseudomonadaceae family, particularly the Pseudomonas genus to which belong the following specie:

*Pseudomonas fluorescens*
*Pseudomonas ovalis*
*Pseudomonas cruciviae*

The Eubacteriales order, for example the Achromobacteraceae family, particularly the Achromobacter genus and the Flavobacterium genus to which belong:

*Flavobacterium aquatile*
*Flavobacterium lutescens*
*Flavobacterium marinum.*

Other families are the Micrococcaceae family, particularly the *Microoccus luteus* and the *Micrococcus flavus* specie, the Brevibacteriaceae family, particularly the Brevibacterium genus.

The Actinomycetales order, for example the mycobacteriaceae and Actinomycetaceae families.

(c) among moulds:

The Mucoraceae family, for example the Rhizopus genus,

The Aspergillales family, for example the Aspergillus and Penicillium generi.

The accompanying drawing illustrates the multi-step process of this invention.

1, 2, 3, 4 and 5 are vessels in which are carried out the five steps of the process.

As shown on this drawing, the fermentation vessel 1 is fed with a pressurized gas containing molecular oxygen (line 6), a nutritive aqueous medium (line 7) and the hydrocarbon feedstock (line 8), the latter being withdrawn from the contact vessel 3 as explained above.

The pressurized gas mixture which has a decreased content of oxygen is withdrawn through line 9. The liquid effluent from the fermentation vessel is passed through line 10 to the separation vessel 2 wherein the microorganisms, withdrawn through line 11 and passed to the washing zone 3, are separated from the aqueous medium which is passed through line 12 to the second fermentation vessel 4.

Sometimes a third phase may be obtained in vessel 2: it consists of the unconverted hydrocarbons.

This third phase may be rejected or recycled back to the first fermentation stage.

The washing vessel 3 is fed with a hydrocarbon cut admitted through line 13 and containing at least 70% and preferably at least 85% by weight of straight-chain paraffins.

The washing liquid is withdrawn through line 14. One part thereof is recycled through line 8 to the first fermentation vessel in which it is used as feedstock. Another part, withdrawn through line 15, may find other uses.

According to another embodiment, one part of the fresh hydrocarbon feedstock is directly passed to the fermentation vessel 1; according to another embodiment, all the washing liquid from unit 3 is passed to unit 1.

The washed microorganisms are conveyed through line 16 from the washing zone to the second fermentation vessel 4, which vessel is also fed through line 9 with air withdrawn from the first fermentation vessel.

The effluent from this second fermentation vessel is passed through line 17 to the separation vessel 5 from which purified microorganisms are withdrawn through line 18 and the aqueous medium through line 19.

One part of this aqueous medium (line 19) may be recycled to the first or the second fermentation stage, i.e. into vessels 1 and 4.

It is obvious that the culture process such as defined herebefore may be completed by any known finishing method; for example, the microorganisms from the fifth step may be subjected to one or several washings with water optionally containing surface active agents, or with organic solvents or mixtures of solvents. The microorganisms may also be subjected to a lysis, i.e. a treatment which breaks the cell walls. A drying of the microorganisms usually completes these finishing treatments.

EXAMPLE

The first step is carried out in a 1 cubic meter cylindrical reactor containing a stirring device. Air is forced therethrough from a blower at a rate of 100 cubic meters per hour. The pressure inside the reactor is 2.5 atmospheres and the temperature is 30° C.±1° C.

This first step consists of the continuous cultivation of a *Candida lipolytica* yeast, said yeast being maintained under growth limiting conditions, the limiting factor being the amount of petroleum cut which has a high content of normal paraffins (main substrate). This hydrocarbon cut, used as feedstock, was obtained by dewaxing a gas-oil cut with urea. It contained 90% of normal paraffins and 10% of a mixture of branched paraffins with naphthenes and aromatics. It was introduced into the reactor through pipe 7 at a rate of 1 kg. per hour together with about 150 liters per hour of an inorganic aqueous solution providing 40 g. per hour of phosphorus compounds, calculated as $P_2O_5$, 35 g. per hour of potassium compounds, calculated as $K_2O$ and 1 g. of magnesium compounds calculated as MgO. The pH control at 4.0±0.1 was obtained by addition of ammonia at a rate corresponding to about 100 g. per hour of nitrogen (N). This inorganic solution contained the other salts, essential to the growth, in sufficient amounts.

A hydrocarbon cut, withdrawn from the third step, was supplied from pipe 8 at a rate of 600 g. per hour.

The effluent, withdrawn from the reactor through pipe 10, consisted of 1.5 kg. per hour of yeast (dry weight), 150 liters per hour of an inorganic solution containing 5 g. of phosphorus ($P_2O_5$) but substantially no potassium or magnesium, and 0.1 kg. per hour of hydrocarbon.

The second step consisted of a decantation resulting in the separation of a yeast cream (20 liters per hour) from an inorganic solution (130 liters per hour).

The third step washing was carried out in a centrifugal machine of the counter-current type. The yeast cream was contacted therein with a hydrocarbon feed of the same type as that described in relation to the first reactor, the ratio by volume of the cream to the feed being about 20/1. The hydrocarbon stream withdrawn from the centrifugation device was passed to the first step reactor.

The fourth step of the process was carried out in a cylindrical reactor of 0.5 m.³ capacity, said reactor being provided with a stirring device. The gaseous effluent from the first step was passed therethrough at a rate of 100 cubic meters per hour. The pressure was about 1 atmosphere and the temperature 30° C.±1° C.

This reactor was continuously fed with the inorganic aqueous solution (130 liters per hour), withdrawn from the second stage apparatus, and with the yeast cream (20 liters per hour) from the washing step.

This secondary fermentation vessel was maintained at constant pH by controlled addition of ammonia, as described hereabove.

The effluent withdrawn at a rate of about 150 liters per hour contained, with respect to this hourly volume, 1.6 kg. of yeast (dry weight), an aqueous inorganic solution containing no more phosphorus compounds, and 1 g. of hydrocarbons.

It is thus obvious that the yeasts are substantially free of hydrocarbons. A further washing of conventional type may be applied thereto, if necessary.

What is claimed as this invention is:

1. A process for growing a microorganism, said process comprising the steps of:
   (a) contacting a hydrocarbon-consuming microorganism with an oxygen-containing gas, an aqueous nutritive medium and a hydrocarbon feed containing branched hydrocarbons and at least 70% by weight of straight-chain paraffinic hydrocarbons, in a first step, said hydrocarbon feed being withdrawn from step (c), the contact time corresponding to a decrease of the total content of straight-chain paraffinic hydrocarbons down to 0.2–5% with respect to the weight of the hydrocarbon feed,
   (b) separating a phase enriched in microorganisms from the major part of the aqueous nutritive medium, in a second step,
   (c) washing the microorganism-containing phase with a hydrocarbon feed containing at least 70% by weight of straight-chain paraffinic hydrocarbons, in a third step, separating thereafter the microorganisms phase from the hydrocarbon feed and passing the latter to the first step of the process, to be used therein as hydrocarbon feed,
   (d) contacting the microorganisms phase of step (c) with an aqueous nutritive medium and an oxygen-containing gas, in a fourth step, and
   (e) separating the microorganisms phase from the aqueous medium, in a fifth step.

2. The process of claim 1, wherein the nutritive aqueous medium withdrawn from the second step is passed to the fourth step to be used as nutrition medium therein.

3. The process of claim 1, wherein the oxygen-containing gas withdrawn from the first step is passed to the fourth step to be used as oxygen-containing gas therein.

4. The process of claim 1, wherein the hydrocarbon feedstock of each of the first and third steps contains at least 85% by weight of straight-chain paraffinic hydrocarbons.

5. The process of claim 1, wherein the third step hydrocarbon feed is selected from the group consisting of dewaxed gas-oils, dewaxed fuel-oils and dewaxed lubricating oils.

6. The process of claim 1, wherein the first and fourth steps nutritive aqueous medium contains assimilable nitrogen and phosphorus compounds, oligoelements, growth factors and additional essential inorganic elements.

7. The process of claim 1, wherein the third step is carried out by a counter-current contact of the microorganisms flowing downwards against the hydrocarbons flowing upwards.

8. A process as defined by claim 1 wherein said oxygen-containing gas in step (a) is under an absolute pressure of 1.2 to 20 atmospheres.

9. A process as defined by claim 1 wherein said oxygen-containing gas in step (a) is under an absolute pressure of 1.5 to 4 atmospheres.

10. A process as defined by claim 1 wherein in step (c) the ratio by weight of the hydrocarbon feed to the microorganisms (dry basis) is 0.5 to 5.

11. A process as defined by claim 1 wherein step (a) is conducted at 20–40° C. at a pH lower than 7.

12. A process as defined by claim 1 wherein said microorganism is a *Candida lipolytica* or Torulopsis yeast, the bacterium *Pseudomonas fluorescens,* or Aspergillus or Penicillium molds.

13. A process for purifying microorganisms contaminated with essentially branched hydrocarbons on the surface thereof, comprising washing said contaminated microorganisms with a hydrocarbon feed containing at least 70% by weight straight-chain paraffinic hydrocarbons to displace said essentially branched hydrocarbons in favor of hydrocarbons having a higher content of n-paraffins, and subjecting the resultant washed microorganisms to a fermentation in the presence of an aqueous nutritive medium and an oxygen containing gas.

References Cited
UNITED STATES PATENTS

| | | | |
|---|---|---|---|
| 3,355,296 | 11/1967 | Perkins et al. | 195—28 R |
| 3,520,777 | 7/1970 | Filosa | 195—96 X |
| 3,522,147 | 7/1970 | Filosa | 195—96 X |
| 3,586,605 | 6/1971 | Hosler | 195—115 X |
| 3,591,455 | 7/1971 | Oppermann | 195—115 X |

JOSEPH M. GOLIAN, Primary Examiner

U.S. Cl. X.R.

195—3 H